United States Patent Office 3,362,989
Patented Jan. 9, 1968

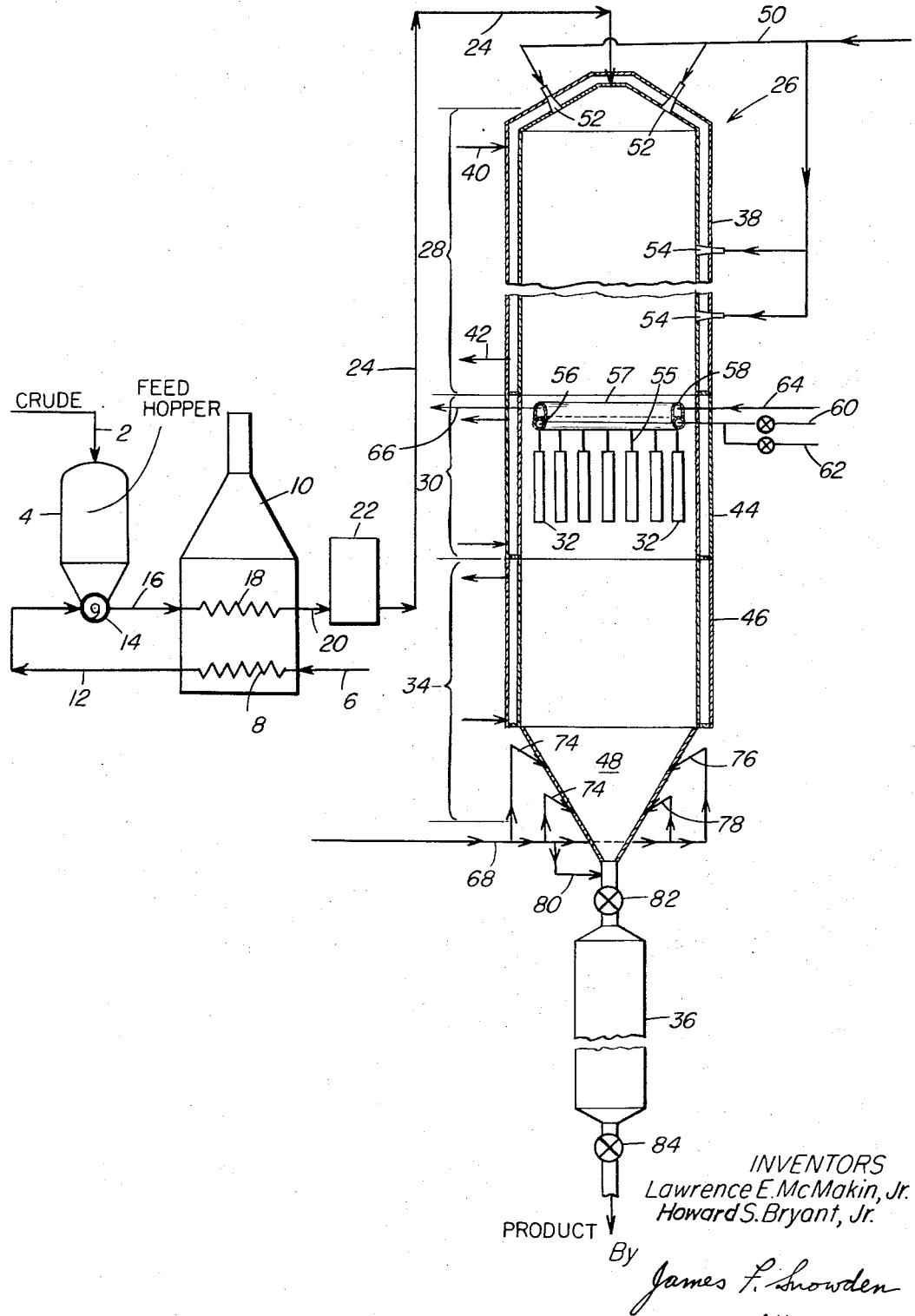

3,362,989
METHOD FOR FRACTIONAL SUBLIMATION
Lawrence E. McMakin, Jr., and Howard S. Bryant, Jr., Beaumont, Tex., assignors to Mobil Oil Corporation, a corporation of New York
Filed July 10, 1964, Ser. No. 381,653
19 Claims. (Cl. 260—525)

The present invention relates to a process and equipment for the purification by fractional condensation of vaporizable solids, that is normally solid substances which can be vaporized without chemical decomposition. It has particular application to the purification of terephthalic acid by sublimation.

A variety of sublimation or vaporization processes have been used commercially for purifying a number of products including substances which can be either condensed or removed as liquids like phthalic anhydride, and those that do not stick to metallic condensation surfaces, such as salicylic acid; as well as the batch processing of a variety of materials such as iodine, anthracene, etc.

Terephthalic acid of high purity is used in large quantities for the preparation of ethylene terephthalate polymers suitable for the manufacture of fibers, films, etc. In producing terephthalic acid by the partial oxidation of p-xylene, a number of impurities are formed which solidify at lower temperatures than the desired product. These impurities are essentially by-products having a lower degree of oxidation. Para-carboxybenzaldehyde

(HOOC—C₆H₄—CHO)

which melts around 480° F. and has a normal boiling point of about 600° F. at atmospheric pressure, is usually the largest and most troublesome individual impurity. In sublimation purification, this compound displays a strong tendency to condense on and become occluded in condensing particles of terephthalic acid which vaporizes and condenses without melting at approximately 572° F. under normal atmospheric pressure. Another impurity is para-toluic acid (HOOC—C₆H₄—CH₃) which melts at 356° F. and has a normal boiling point of 527° F. In addition, terephthalic acid exhibits surface tackiness at temperatures above about 450° F. and its particles tend to stick to equipment walls. Moreover, the layer of solid terephthalic acid in direct contact with the metal wall surfaces discolors, perhaps as a result of some catalytic action or higher local temperatures. This problem is likely to be particularly acute in the lower part of the condenser where the vessel is desirably tapered for continuous withdrawal of the product solids.

The process and equipment of the present invention are especially suitable for effecting the fractional condensation in a continuous sublimation operation of terephthalic acid from vapor to solids and the subsequent separation of the solids from uncondensed vapors under controlled temperatures and pressures with minimum occlusion of foreign matter while avoiding deposition of terephthalic acid in tacky condition on any equipment surfaces. A highly purified product having significantly improved solution color characteristics is obtainable in high yield. However, the utility of this invention is not restricted to that specific application for it is useful in a wide variety of fractional condensations of mixtures of vaporized solid materials of different volatilization characteristics or different solidification temperatures.

The present invention relates to a method and apparatus for the purification of vaporizable, normally solid substances by steps which include introducing a gaseous mixture of a vaporized solid substance with material solidifying at a lower temperature than said substance into a confined condensation zone having the boundary surface thereof maintained at temperatures above the dew point of the adjoining gaseous mixture, cooling said gaseous mixture by direct heat exchange with a cooling medium to form condensed particles of said substance out of contact with any fixed surface in said condensation zone, separating condensed particles of said substance in solid form from said material while in direct heat exchange with an additional coolant in gaseous form in a confined disengaging zone having at least a major area of its boundary surface maintained at temperatures above the dew point of the adjoining gaseous mixture, and thereafter collecting said separated solid particles in a confined collection zone through which said additional coolant is flowing while maintaining at least a major area of the collection zone boundary surface at substantially lower temperatures than those of said disengaging zone boundary surface. The term "boundary surface" is employed herein to designate impermeable confining walls, etc., and not porous filter surface.

Other aspects of the invention relate to various features, such as the travel of the substance undergoing purification and various cooling agents within the aforesaid zones, several indications of suitable rates of introducing or passing said additional coolant through the collection zone a vaporizing step in combination with the aforesaid fractional condensation, heating the uncondensed gaseous material as it is withdrawn from the disengaging zone, dislodging deposits on a porous filter member by the blow-back technique, multistage sublimation for further purification, as well as the purification of terephthalic acid specifically and other aromatic acids in general. Still other features of the invention, as well as its objects and advantages, will be apparent to those skilled in the art after full consideration of the disclosure which follows.

For a better understanding of the nature and objects of this invention, reference should be had to the accompanying drawing which is a flow sheet or schematic representation of a one-stage sublimation system with the primary condensing vessel shown in sectional elevation. For greater clarity, many controls and accessory equipment have been omitted from the drawing since they are well known in the art. Unless otherwise indicated herein, all temperatures are set forth in degrees Fahrenheit (° F.) and all proportions in terms of weight.

A crude terephthalic acid, obtained by partially oxidizing p-xylene and leaching the oxidation product with acetic acid, is introduced as a dry powder through the conduit 2 into the feed hopper 4. This partially purified material contains 3,000 parts per million (p.p.m.) of p-carboxybenzaldehyde (PCB), 2,000 p.p.m. of p-toluic acid and 60 p.p.m. by weight of ash as the chief impurities. Steam is charged through line 6 to the heating coil 8 in a furnace 10 where it is superheated to a temperature of 550° F. In serving as an entrainer or carrier gas, the superheated steam passes through pipe 12 at high velocity to the screw feeder or star feeder 14 at the bottom of hopper 4 where it picks up the powdered charge in a ratio of 16 mols of steam per mol of terephthalic acid and transports it through conduit 16 to the vaporization coil 18 in furnace 10. Substantially all of the solids are vaporized in that coil and the effluent is carried by line 20 to the ash filter 22 which removes ash and other solids, including catalyst residues, from the vaporized terephthalic acid.

The vapor stream then proceeds through line 24 and enters the primary condenser 26 at an inlet temperature of about 650° F. for fractional condensation at atmospheric pressure. This vertical cylindrical tower desirably has an inside diameter of at least several feet to minimize wall effects. It has a length:diameter ratio of about 3.0 for the condensation zone 28 in the upper part thereof and a ratio of about 5.2 overall. An intermediate disengaging zone 30 is provided with the porous metal cartridge filters 32. Below this is the lower collection zone 34 in which the sublimate is allowed to accumulate in the tapered bottom before being dropped down into the vessel or receiver 36 from which the terephthalic acid product is withdrawn.

The wall of the condensation zone 28 is surrounded by an external jacket 38 which is heated by any suitable means as exemplified by hot flue gas entering in line 40 and leaving in line 42. This maintains the inner surface of the shell of the condensation zone at an average temperature of 660° F. which is 20° above the dew point of the vapor being admitted to the vessel from line 24. The disengaging zone 30 is provided with a similar jacket 44 which may be heated in the same manner or with other heating fluids in maintaining a temperature of 550° F. as the dew point of the gaseous suspension adjoining the wall of this zone is now about 536° F. by reason of the condensation occurring in zone 28. Still another heating jacket 46 around the upper part of the collection zone 34 is employed primarily to prevent condensation of steam on the wall of that zone. A considerably lower average wall temperature of about 310° F. is maintained in this zone to prevent the accumulated product particles from adhering to the wall. The lower wall of the collection zone is preferably uninsulated in order to permit as much cooling as possible by convection and radiation in maintaining the aforesaid average temperature.

For cooling the vapor stream, water entering through line 50 under pressure is discharged as fine sprays through the inset spray nozzles 52 at the top and also optionally through the nozzles 54 which are in the side wall of the vessel for use in providing additional cooling or to alter the distribution of the cooling water in the condensation zone. The total charge of cooling water amounts to 4.2 pound mols or 76 pounds of water at 100° F. per mole of terephthalic acid charged to the condenser. The nozzles 52 and 54 are aligned in such manner as to minimize water striking and cooling the hot walls of the condensation zone and to provide intimate contact between the charge vapor and the droplets of water in the sprays until the water has evaporated in absorbing heat from the vapor.

The cartridge filters 32 in a circular row extending around the circumference of the disengaging zone 30 are individually connected by pipes 55 to the bottom conduit 56 of a ring or torus-shaped manifold 57 which is also provided with an upper heating conduit 58. A valved discharge line 60 is connected to bottom conduit 56 for withdrawing the gaseous phase. There is also a valved blow-back line 62 connected to discharge pipe 60. In order to clear deposits of solid particles from the surfaces of these filters by the reverse flow of gaseous material through the filters, nitrogen or another inert blow-back gas is introduced intermittently through the blow-back line 62 and conduits 60, 56 and 55 while the valve in discharge pipe 60 is closed.

As an optional but desirable feature, the upper conduit 58 of the ring manifold is heated by a suitable fluid heating medium entering from supply pipe 64 flowing around both sides of the manifold conduit 58 and out through line 66. By this means, the manifold 57 is maintained at a temperature above the dew point of the surrounding vapor stream thereby preventing any deposits from condensing or settling on the manifold. In addition, this heating eliminates any possibility of condensation occurring in the gaseous phase in the bottom collection duct 56 of the manifold. Alternatively, the manifold 57 may be heated by electric heat elements instead of the fluid heating medium.

It is also contemplated that the filters 32 and the filter manifold may be located out of the direct path of the falling particles of condensate. For example, condenser 26 may be constructed with disengaging and collection zones 30 and 34 of greater diameter than condensation zone 28 and the filters offset from the main gas-solids suspension in being located close to the exterior wall in the expanded circumferential region of the disengaging zone. Alternatively, the filters may be located in a separate vessel which communicates with disengaging zone 30. In the latter case, an additional collection zone would be provided at the bottom of the filter vessel to collect that portion of the condensed solids which settle therein.

Cold inert gas is introduced as an additional cooling agent into the lower part of collection zone 34 from the manifold 68 and the branch pipes 72, 74, 76, 78 and 80 at a total rate of 5 standard cubic feet (s.c.f.) per pound of terephthalic acid charged. The inlet ends of these pipes are desirably aimed in either a horizontal or a downward direction to minimize clogging by the condensed solids.

A suitable valve 82 is provided at the bottom of condenser 26 for admitting the product solids into a receiver or lock chamber 36 and the latter is equipped with a suitable discharge valve 84 at its bottom.

In the fractional condensation step of the sublimation operation, the charge of steam, terephthalic acid and associated impurities in vapor form enters the top of the condensation zone in inlet line 24 and is immediately subjected to contact with the initial cooling medium in the form of fine sprays of cooling water which are directed downwardly concurrently with the flow of the vapor. The main or central stream of the charge vapor is quickly reduced below the dew point or snow point of the terephthalic acid and small solid particles of the latter are formed and grow in size as the mixture proceeds down the column. By reason of its low concentration, most of the p-carboxybenzaldehyde remains in the vapor state but some of it is condensed on the descending terephthalic acid particles. Any particles of solid terephthalic acid or droplets of PCB which drift or brush against the heated wall of the condensation zone 28 are rapidly vaporized by heat received from this hot surface; hence condensed material does not accumulate on the wall surface. Nevertheless, the heated wall does not substantially effect the temperature of the bulk vapor suspension when the diameter or cross sectional area of this zone is adequate, and an average vapor temperature of about 570° F. is maintained there despite the higher wall temperature.

The entire mixture of solids, entrainer steam and the vaporized cooling water descends into the disengaging zone where it is met by an up-flowing current of the gaseous secondary or additional cooling agent from the collection zone, and also by intermittent streams of blow-back gas as individual filters in the battery are periodically cleared of deposits. The additional coolant may be termed a secondary cooling agent since it is not initially in contact with the material to be condensed when condensation commences but instead serves immediately thereafter to cool the condensed solids in the temperature range below the solidification point; however, this secondary cooling medium should not be confused with a coolant used in a secondary condenser for it is employed in the primary condenser. In the disengaging zone, the gaseous phase of the suspension is withdrawn through the filters 32 and conduits 55, 56 and 60. The separated gaseous phase contains the entrainer steam, the steam formed by the evaporation of the cooling water inside the condenser, the inert secondary cooling gas, and a major proportion of the PCB and other impurities present as contaminants in the vaporized charge. To prevent condensation of the filtered gas phase in ducts 56 and 60, heat is supplied to the former by the heating fluid in the manifold passage 58 and pipe 60 is well insulated and heated, if necessary, by electrical heating elements (not shown) in order to maintain the temperature of the gas phase between about 20 and 50° F. above the 500° F. average vapor temperature prevailing in the disengaging zone. A minor amount of uncondensed terephthalic acid is also contained in the off-gas and this is recovered along with the vaporized foreign matter in a secondary condenser or scrubber (not shown) for recycling to the partial oxidation reaction in order to conserve raw material and obtain substantially quantitative yields.

The terephthalic acid particles, including the material dislodged from filters 32, continue to descend alone through the upward flow of the secondary coolant into the collection zone 34 as substantially all of the other material introduced into the vessel 26 has been taken off in the exhaust line 60. In traveling down through zone 34, the descent of the particles is slowed considerably by the current of secondary cooling gas rising at a velocity less than the average terminal settling velocity of the solid particles. This gas stream further cools the solid particles until their temperature is lowered to about 200° F. by the time they first touch the metal surface of the conical part of the collection zone 34. At this temperature, the particles are devoid of surface tackiness and there is little or no tendency for the particles to become discolored in contact with the metal. The average residence time for the passage of the terephthalic acid charge through the condensation zone is 40 seconds.

The accumulated product is allowed to slide down through the open valve 82 to the product receiver 36. When this chamber is full, valve 82 is closed and the product is withdrawn through the valve 84 at the bottom. In this first sublimation stage, the yield of terephthalic acid solids from the receiver 36 amounts to 90% by weight of the crude terephthalic acid charged; and the foreign matter content of this product is only 387 p.p.m. of p-carboxybenzaldehyde (an 87% reduction), 100 p.p.m. of p-toluic acid (a 95% reduction) and less than 5 p.p.m. of ash. This corresponds to a 92% equilibrium in p-carboxybenzaldehyde reduction and a 95% approach to that equilibrium. There is also a substantial improvement in solution colors as the initial values of 60 on the American Public Health Association (APHA) scale for both a 1% solution of the crude in sulfuric acid and a 5% solution thereof in dimethyl formamide are reduced to final values of only 20 and 15, respectively, for solutions of the sublimed product in the same solvents. With careful control of the operation, APHA color values as low as 5 in both solutions are obtainable. In addition the turbidity of a 5% solution in dimethyl formamide is 4.5 before and 0 after the sublimation.

In order to obtain a more highly purified terephthalic acid, the first stage product is resublimed in a second sublimation stage employing fractional condensation in equipment of the same type and operating under the same conditions as the initial sublimation operation described with generally similar results. The off-gas is condensed in a secondary condenser or scrubber and recycled to the oxidation reactor and a 90% recovery of the terephthalic acid charged to this stage is obtained with a content of only 50 p.p.m. of p-carboxybenzaldehyde (an 87% reduction), less than 50 p.p.m. of p-toluic acid and less than 5 p.p.m. of ash.

Several features of the fractional condensation step of the process described are of particular significance. While the temperature of the bulk vapor stream is quickly reduced below the snow point of terephthalic acid in the condensation zone, the inner wall surface thereof is held at temperatures above the dew point of the adjoining vapor mixture to avoid any deposit of material on the wall. This does not mean that the temperatures of the wall surface must be uniform since the dew point of the descending gaseous mixture is gradually reduced as material condenses in the center of the stream; hence wall temperatures in the lower part of the zone may be somewhat lower than at the top.

In addition, the wall temperatures of a major area (i.e. more than half of the total wall area) of the disengaging zone are maintained above the dew point, for example, preferably 5 to 20° F. above the dew point of the adjoining gaseous mixture there. Expressed another way, the average wall temperature in this zone should be above the average dew point of the gaseous mixture in the disengaging zone. However, it is not necessary to maintain the surfaces of the filters in this zone at such high temperatures for there is no objection to having solid terephthalic acid particles at temperatures above 450° F. in contact with the filter surfaces. Moreover, the residence time of solids on filter surfaces is relatively brief as the particles are dislodged frequently by blow-back gas for further cooling in the lower zone. A relatively high vapor temperature is desirable in the disengaging zone, provided that this temperature is below the snow point of the terephthalic acid.

The countercurrent flow of a secondary cooling agent in gaseous form up through the collection zone performs a number of important functions. First, it cools the descending solid particles to a temperature well below the minimum of the surface tackiness level (about 450° F.) before these particles contact a metal surface, and this effect is enhanced by the fact the upflowing gas retards the fall of these particles thereby allowing more time and contact with the gas for cooling. Second, it substantially eliminates or at least minimizes the migration of uncondensed vapor into the collection region and the subsequent condensation there of p-carboxybenzaldehyde, other impurities and water on the product solids. Third, this gas stream tends to desorb, in countercurrent contact, any p-carboxybenzaldehyde on the surface of solid terephthalic acid particles. Fourth, this flow dilutes the gas stream passing through the filters thereby lowering its dew point and increasing its linear velocity, and both of these factors reduce the possibility of condensation occurring in the exhaust lines.

The average temperature of the wall surface of the lower collection zone is maintained at a substantially lower average temperature than the wall or walls of the disengaging zone. While the upper part of the wall of this zone, which is adjacent to the disengaging zone, may be at a somewhat higher temperature; the major area of the wall surface of the collection zone, especially the lower part of that surface, is maintained at temperatures below 450°, and preferably less than about 300° F.

Suitable ranges of process variables in the method described hereinbefore for subliming terephthalic acid include an entrainer gas flow between about 2 and 100 or more s.c.f. per pound of crude terephthalic acid and this figure is generally less than about 50 s.c.f. As long as satisfactory entrainment of terephthalic acid powder and vapor are obtained, it is desirable to keep the volume of carrier gases as small as possible to minimize heating costs and the size of the equipment. Vapor temperatures at the outlet of the vaporization furnace are desirably in the range of about 580–740° F. The ash filter and transfer lines are typically well insulated or heated; therefore the inlet temperature of the vapor mixture into the condenser is maintained at about the same level. The fractional condenser may be operated at static pressures exemplified by the range from about 1 to 30 pounds per square inch absolute (p.s.i.a.) or more, and pressures between about 12 and 18 p.s.i.a. are usually preferred.

In illustrating suitable temperatures of the bulk vapor stream containing suspended terephthalic acid solids and the wall temperatures in the various zones of the condenser, the average vapor temperature in the condensation zone may range from about 530 to 600° F., and preferably between about 550 and 580°, while the average wall temperature is maintained between about 570 and 700° and preferably between about 615 and 650°. Expressed another way, it is preferable to maintain any point on the walls of the condensation zone at a temperature at least about 10° F. higher than the dew point of the gaseous mixture adjoining that point. In general, the average vapor temperature in the disengaging zone is desirably between about 430 and 560° F. and the range of about 480–540° is preferred in many cases, whereas the average wall temperature of this zone is usually from about 450 to 560° and preferably between about 480 and 520°. The average vapor temperature in the collection zone is below about 400°, and desirably less than about 300° in order to cool the descending solids to a temperature below 450° before they contact the wall surface which may be maintained at a temperature below 450° and preferably below about 300° F.

A wide variety of carrier or entraining agents may be used for transporting the terephthalic acid to the condenser provided that the material selected is stable at the temperatures involved, inert to the terephthalic acid and in the vapor state at the temperatures maintained in the disengaging zone. For example, nitrogen is suitable for for the purpose and carbon dioxide is even better since it tends to inhibit the decarboxylation of terephthalic acid at high temperatures. However, steam is the preferred agent since it is readily available and low in cost. In any event, the presence of some steam in the carrier gas, as for instance at least about 30% by volume, is desirable to inhibit dehydration of the terephthalic acid to its anhydride or polyanhydride at high temperature.

In inert, initial cooling medium or mediums used for cooling the vapor in the condensation zone by direct heat exchange may be introduced in solid, liquid or in gaseous form. Suitable solid cooling agents include materials which vaporize at the separation temperature in the disengaging zone and also purified terephthalic acid particles which have been recycled to the condenser. Such materials may be introduced by screw feeders which also serve to seal the condensing chamber. Liquid coolants may be exemplified by water, acetic acid and p-xylene and gaseous cooling agents by nitrogen, carbon dioxide and low temperature steam. Water is preferred for low cost, for inhibiting dehydration of the terephthalic acid and for its high latent heat of vaporization which enables a small quantity of water to provide a great cooling effect.

Nitrogen, carbon dioxide or steam may be used as the blow-back gas to clear the filters.

The additional or secondary cooling medium introduced into the collection zone may be any inert gaseous material or solid or liquid which is converted into gaseous form under the conditions prevailing in that zone. For example, liquid carbon dioxide may be sprayed into that zone in the form of snow, or solid carbon dioxide ("Dry Ice") granules may be carried by a screw feeder into the collection zone. Low temperature steam may be used as coolant but a non-condensible inert gas such as nitrogen or carbon dioxide must be added near the product solids outlet to prevent steam condensation at this point.

While the process and apparatus of this invention are of especial interest for the purification of terephthalic acid, many other uses and embodiments of the invention will be readily apparent to those skilled in the art upon consideration of the technique and apparatus described for purifying this specific crude material. The maximum benefits of the invention are realized in separating truly sublimable solid substances (i.e. materials which both vaporize and condense without melting) from mixtures containing other vaporizable solids having either lower solidification temperatures or greater volatility than the sublimable solid. However, the instant process may be employed in fractionating mixtures containing a material which first condenses as a liquid whenever it is feasible to cool the liquid condensate below its freezing point by the time the condensate descends to the disengaging zone. The novel method and apparatus may be utilized in purifying vaporizable, normally solid carboxylic acids, especially aromatic and polycarboxylic acids, such as isophthalic and terephthalic acids. For example, mixtures of isophthalic acid and terephthalic acid may be separated into an isophthalic acid vapor phase and a terephthalic acid solid condensate. Also, dimethyl terephthalate may be recovered as the desired product in gaseous phase while terephthalic acid is condensed in the solid phase in the fractional condensation of a mixture of a small amount of the acid with ester.

To further illustrate the principles of this invention, examples are tabulated hereinafter of prolonged runs of 16 to 87 hours in continuously subliming various terephthalic acid (TPA) charges to separate p-carboxybenzaldehyde (PCB) therefrom in a small scale unit having a 12-inch diameter primary condenser 11.5 ft. long containing a 7-foot long condensation zone. The listed results are, of course, not fully representative of commercial practice on a large scale due to the greater wall effect of this narrow vessel and the lower separation efficiencies of smaller equipment, etc. For example, in order to procure sufficient cooling in the disengaging zone the separation temperatures employed are generally lower than the optimum temperatures for larger scale operations.

All of the charges in these examples are derived from the oxidation of p-xylene and subjected to a preliminary washing with acetic acid, except for Examples 2, 6 and 7 in which once-sublimed TPA charges are employed.

The stated wall temperature is the average temperature of the walls of the condensation zone. In the collection zone, wall temperatures near the top are typically in the 320–350° F. range and those at the bottom are 280–290° F. The total residence time of the terephthalic acid in the condensation and disengaging zones is between about 20 and 100 seconds. Water is sprayed into the condensation zone under the pressure of a minor amount of nitrogen as the initial coolant except in Example 8 in which a mixture of steam and nitrogen is substituted. Gaseous carbon dioxide is introduced near the bottom of the collection zone to serve as the secondary cooling gas. The average solids separation temperature is actually measured as the vapor temperature near the top of the filters.

| Example No. | 1 | ¹2 | 3 | 4 |
|---|---|---|---|---|
| Vaporizer Operation: | | | | |
| TPA Feed Rate, lb./hr. | 2.8 | 3.6 | 3.0 | 2.9 |
| Entrainer Gas Mix, mol steam/mol $CO_2$ | 1.0 | 1.0 | 2.0 | 1.0 |
| Entrainer Gas Flow, mol/mol TPA feed | 35.4 | 28.0 | 11.0 | 14.9 |
| Average Temperature, ° F. | 673 | 643 | 668 | 707 |
| Average Pressure, p.s.i.a. | 12.5 | 12.4 | 12.9 | 18.1 |
| Average Residence Time, sec. | 5.1 | 5.3 | 7.2 | 6.8 |
| Condensation Zone: | | | | |
| Coolant Rate, mol/mol TPA feed | 5.1 | 4.0 | 5.4 | 9.7 |
| Average Wall Temperature, ° F. | 642 | 648 | 633 | 640 |
| Disengaging Zone: Avg. Solids Separation Temperature, ° F. | 525 | 455 | 492 | 463 |
| Collection Zone: | | | | |
| Average Pressure, p.s.i.a. | 9.5 | 9.1 | 12.1 | 15.7 |
| $CO_2$ Coolant Rate, mol/mol TPA feed | 1.9 | 0.79 | 0.95 | 0.98 |
| Product Recovery, wt. percent of feed | 83.4 | 79.8 | 86.9 | 89.9 |
| PCB Reduction, percent | 91.9 | 94.1 | 85.8 | 82 |

| | Feed | Prod. | Feed | Prod. | Feed | Prod. | Feed | Prod. |
|---|---|---|---|---|---|---|---|---|
| Analyses: | | | | | | | | |
| PCB, p.p.m. by wt. | 15,000 | 1,210 | 5,700 | 337 | 12,000 | 1,705 | 12,000 | 2,200 |
| Solution Colors, APHA: | | | | | | | | |
| 5% in Dimethyl Formamide | 60 | 20 | 30 | 30 | 60 | 25 | 60 | 35 |
| 1% in Sulfuric Acid | 60 | 20 | 60 | 25 | 60 | 25 | 50 | 20 |

| Example No. | 5 | 1 6 | 1 7 | 8 |
|---|---|---|---|---|
| Vaporizer Operation: | | | | |
|   TPA Feed Rate, lb./hr | 2.9 | 2.5 | 2.5 | 3.5 |
|   Entrainer Gas Mix, mol steam/Mol $CO_2$ | 1.1 | 1.0 | 0.44 | 0.93 |
|   Entrainer Gas Flow, mol/mol TPA feed | 15.7 | 12.1 | 10.4 | 12.0 |
|   Average Temperature, °F | 691 | 723 | 677 | 720 |
|   Average Pressure, p.s.i.a | 18.4 | 11.4 | 8.4 | 19.9 |
|   Average Residence Time, sec | 8.3 | 7.7 | 6.0 | 8.7 |
| Condensation Zone: | | | | |
|   Coolant Rate, mol/mol TPA feed | 7.3 | 13.2 | 10.7 | 2 47.4 |
|   Average Wall Temperature, °F | 625 | 626 | 629 | 649 |
| Disengaging Zone: Avg. Solids Separation Temperature, °F | 495 | 485 | 490 | 490 |
| Collection Zone: | | | | |
|   Average Pressure, p.s.i.a | 16.6 | 9.8 | 6.9 | 17.6 |
|   $CO_2$ Coolant Rate, mol/mol TPA feed | 1.27 | 1.48 | 1.48 | 1.1 |
|   Product Recovery, wt. percent of feed | 82.7 | 83.9 | 82.4 | 89.6 |
|   PCB Reduction, percent | 85.0 | 88.0 | 90.0 | 87.0 |

| | Feed | Prod. | Feed | Prod. | Feed | Prod. | Feed | Prod. |
|---|---|---|---|---|---|---|---|---|
| Analyses: | | | | | | | | |
|   PCB, p.p.m. by wt | 12,000 | 1,850 | 3,000 | 365 | 3,000 | 313 | 18,000 | 2,340 |
| Solution Colors, APHA: | | | | | | | | |
|   5% in Dimethyl Formamide | 60 | 30 | 25 | 15 | 25 | 20 | 100+ | 25 |
|   1% in Sulfuric Acid | 50 | 35 | 40 | 10 | 40 | 15 | 50 | 30 |

[1] Using a blend of previously sublimed TPA as the charge.
[2] Employing a mixture of steam and nitrogen as the initial coolant.

The reduction in p-carboxybenzaldehyde content furnishes a good measure of the overall efficiency in purifying terephthalic acid produced by the partial oxidation of p-xylene since this aldehyde is more difficult to remove than the other more volatile impurities such as p-toluic acid and terephthalic-aldehyde (1,4 benzenedicarbonal) which are commonly present.

With due allowance for the limitations of small scale equipment, it is apparent from the preceding examples that the practice of the present invention provides good recoveries of highly purified products from crude materials containing varying amounts of impurities. A significant improvement in the important matter of solution colors is also realized. Substantially quantitative yields are obtainable by passing the gaseous product phase to a water scrubber in which all of the remaining TPA and other organic compounds are condensed and then recycled to the partial oxidation process. It is also noteworthy in a number of the examples that the principal impurity, PCB, is removed in the gaseous phase at separation temperatures below its melting point of about 480° F.

While the present invention is described in detail in connection with the purification of terephthalic acid, it is evident that the invention is capable of many other modifications and embodiments which are apparent to those skilled in the art. Accordingly, this invention should not be construed as limited in any particulars except as may be recited in the appended claims or required by the prior art.

We claim:

1. In a process for the purification of vaporizable, normally solid substances, the steps which comprise introducing a gaseous mixture of a vaporized solid substance with material solidifying at a lower temperature than said substance into a confined condensation zone having a boundary surface maintained at temperatures above the dew point of the adjoining gaseous mixture, cooling said gaseous mixture by direct heat exchange with a cooling medium to form condensed particles of said substance out of contact with any fixed surface in said condensation zone, separating condensed particles of said substance in solid form from said material while in direct heat exchange with an additional coolant in gaseous form in a confined disengaging zone having at least a major area of boundary surface maintained at temperatures above the dew point of the adjoining gaseous mixture, and thereafter collecting said solid particles in a confined collection zone through which said additional coolant is flowing while maintaining at least a major area of the collection zone boundary surface at substantially lower temperatures than those of said disengaging zone boundary surface.

2. A process according to claim 1 in which said additional coolant is introduced into said collection zone at a rate sufficient to minimize the entry of said material into said collection zone.

3. A process according to claim 1 in which said condensed particles travel from said condensation zone through said disengaging zone to said collection zone, said cooling medium and said material travel from said condensation zone to said disengaging zone and are there separated in gaseous form from said condensed particles, and said additional coolant travels in gaseous form from said collection zone to said disengaging zone and is there separated from said condensed particles.

4. A process according to claim 1 in which said vaporized solid substance is an aromatic carboxylic acid.

5. A sublimation purification process which comprises vaporizing a mixture containing a sublimable substance and material solidifying at lower temperature than said substance, cooling the resulting gaseous mixture by direct heat exchange with an initial cooling medium sufficiently to condense said substance directly into solid particles out of contact with any fixed surface in a confined condensation zone having a boundary surface maintained at temperatures above the dew point of the adjoining gaseous mixture, separating said material from said solid particles while in direct heat exchange with an additional coolant in gaseous form in a confined disengaging zone having at least a major area of the impermeable boundary surface thereof maintained at temperatures above the dew point of the adjoining gaseous mixture, and thereafter collecting said solid particles by gravity in a confined collection zone through which said additional coolant is flowing toward said disengaging zone while maintaining at least a major area of the boundary surface of said collection zone at substantially lower temperatures than the average temperature of the impermeable boundary surface of said disengaging zone.

6. A process according to claim 5 in which said initial cooling medium is in gaseous form in said disengaging zone and said additional coolant is introduced into said collection zone at a rate sufficient to minimize the entry of said material into said collection zone.

7. A process according to claim 5 in which said solid particles travel from said condensation zone through said disengaging zone to said collection zone, said initial cooling medium and said material travel from said condensation zone to said disengaging zone and are there separated in gaseous form from said solid particles, and said additional coolant travels in gaseous form from said collection zone to said disengaging zone and is there separated from said solid particles.

8. A process according to claim 5 in which said disengaging zone is vertically below and in direct communication with said condensation zone and said collection zone is vertically below and in direct communication with said disengaging zone, whereby said solid particles descend substantially vertically through said three zones.

9. A process according to claim 5 in which uncondensed gaseous material is withdrawn from said disengaging zone and substantially immediately heated to a temperature at least about 20° F. higher than the vapor temperature at the time of separation from said solid particles.

10. A process according to claim 5 in which said separation is effected by withdrawing said material from said disengaging zone through a porous member and a gaseous agent is intermittently passed in the opposite direction through said member into said disengaging zone to dislodge deposits of said solid particles from a surface of said porous member.

11. A multistage sublimation process according to claim 5 in which said solid particles are withdrawn from said collection zone with a substantially reduced content of said material therein and resublimed at least once to further purify said sublimable substance.

12. A process according to claim 5 in which a mixture containing a major proportion of terephthalic acid and a minor proportion of an associated impurity is vaporized.

13. A continuous process according to claim 5 in which said solid particles descend from said condensation zone through said disengaging zone to said collection zone, said initial cooling medium in gaseous form and said material descend from said condensation zone to said disengaging zone, said additional coolant rises from said collection zone to said disengaging zone at a rate sufficient to minimize the entry of said material into said collection zone, and said material together with said initial cooling medium and said additional coolant are separated from said solid particles in said disengaging zone.

14. A process according to claim 13 in which said additional coolant is introduced into said collection zone at a rate sufficient to substantially retard the rate of descent of said solid particles.

15. A process according to claim 13 in which the linear velocity of said rising additional coolant is below the average terminal settling velocity of said solid particles.

16. A sublimation purification process which comprises vaporizing a mixture containing a major proportion of terephthalic acid and a minor proportion of p-carboxybenzaldehyde as an impurity, cooling the resulting gaseous mixture by direct heat exchange with an initial cooling medium sufficiently to condense said acid directly into solid particles out of contact with any fixed surface in a confined condensation zone having a boundary surface maintained at temperatures above the dew point of the adjoining gaseous mixture, separating said aldehyde from said solid particles while in direct heat exchange with an additional coolant in gaseous form in a confined disengaging zone having at least a major area of the impermeable boundary surface thereof maintained at temperatures above the dew point of the adjoining gaseous mixture, and thereafter collecting at least a major proportion of said vaporized terephthalic acid and not more than a minor proportion of said aldehyde in the form of said solid particles by gravity in a confined collection zone through which said additional coolant is flowing toward said disengaging zone while maintaining at least a major area of the boundary surface of said collection zone at substantially lower temperatures than the average temperature of the impermeable boundary surface of said disengaging zone.

17. A process according to claim 16 in which the average vapor temperature in said disengaging zone is maintained between about 300 and 550° F. and the average temperature of said solid particles in said collection zone is maintained substantially below 450° F.

18. A process according to claim 16 in which said additional coolant is introduced into said collection zone at a rate sufficient to cool the descending terephthalic acid particles to a temperature substantially below 450° F. while said particles are still in suspension.

19. A sublimation purification process which comprises vaporizing a mixture containing a sublimable substance and material solidifying at lower temperature than said substance, cooling the resulting gaseous mixture by sufficient direct heat exchange with an initial cooling medium to condense said substance directly into solid particles out of contact with any fixed surface in a confined zone having a boundary surface maintained at temperatures above the dew point of the adjoining gaseous mixture, separating said material from said solid particles while in direct heat exchange with an additional coolant in gaseous form in a confined disengaging zone having the impermeable boundary surface thereof maintained at an average temperature above the dew point of the gaseous mixture in said disengaging zone and thereafter collecting said solid particles by gravity in a confined collection zone through which said additional coolant is flowing toward said disengaging zone while maintaining a boundary surface of said collection zone at a substantially lower average temperature than the impermeable boundary surface of said disengaging zone.

References Cited

UNITED STATES PATENTS

| 1,686,913 | 10/1928 | Jaeger | 260—525 |
| 2,923,736 | 2/1960 | MacLean | 260—525 |
| 2,944,878 | 7/1960 | Jacque et al. | 23—294 |

OTHER REFERENCES

Wilke, C. R., "Sublimation," Chemical Industries, 63, 34–38, 122, 124 (July 1948), TPIC 383.

LORRAINE A. WEINBERGER, *Primary Examiner.*

S. B. WILLIAMS, *Assistant Examiner.*